US006399156B1

(12) United States Patent
Wexler et al.

(10) Patent No.: US 6,399,156 B1
(45) Date of Patent: Jun. 4, 2002

(54) METHOD FOR PREPARING AN INK JET RECORDING ELEMENT

(75) Inventors: Allan Wexler, Pittsford; Paul D. Yacobucci, Rochester, both of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/896,696

(22) Filed: Jun. 29, 2001

(51) Int. Cl.[7] .......................... B05D 1/36; B32B 23/08

(52) U.S. Cl. .................... 427/407.1; 427/411; 427/414; 428/511; 521/50

(58) Field of Search ............................ 29/890.1; 347/1, 347/22; 427/402, 407.1, 411, 414; 521/50; 428/423.1

(56) References Cited

U.S. PATENT DOCUMENTS 5,605,750 A * 2/1997 Romano et al. ............ 347/105
6,190,843 B1 * 2/2001 Yau et al. ................... 430/350
6,268,101 B1 * 7/2001 Yacobucci et al. .......... 347/102
6,312,858 B1 * 11/2001 Yacobucci et al. .......... 347/105

* cited by examiner

*Primary Examiner*—Shrive P. Beck
*Assistant Examiner*—William Phillip Fletcher, III
(74) *Attorney, Agent, or Firm*—Harold E. Cole

(57) ABSTRACT

A method for making a porous ink jet recording element having a uniform, protective layer by coating on a support the following layers in order: a) a porous, image-receiving layer containing a diffusible coagulant; and b) a layer containing a dispersion of particles which are capable of forming a particle gel with a coagulant; c) the diffusible coagulant thereby diffusing into the layer containing the dispersion of particles, causing the layer to set to a particle gel; and d) drying the element to obtain a uniform, protective layer on top of the porous, image-receiving layer.

19 Claims, No Drawings

METHOD FOR PREPARING AN INK JET RECORDING ELEMENT

FIELD OF THE INVENTION

This invention relates to a process for forming an ink jet recording element, more particularly to a process for forming an ink jet recording element with a uniform protective overcoat.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof.

An ink jet recording element typically comprises a support having on at least one surface thereof an ink-receiving or image-forming layer. Again typically, the ink-receiving layer is either a porous layer that imbibes the ink via capillary action or a polymer layer that swells to absorb the ink.

Ink jet prints, prepared by printing onto ink jet recording elements, are subject to environmental degradation. They are especially vulnerable to water smearing and light fade. For example, since ink jet dyes are water-soluble, they can migrate from their location in the image layer when water comes in contact with the receiver after imaging. Highly swellable hydrophilic layers can take an undesirably long time to dry slowing printing speed, and will dissolve when left in contact with water, destroying printed images. Porous layers speed the absorption of the ink vehicle, but often suffer from insufficient gloss and severe light fade.

In order to reduce the vulnerability of ink jet prints to water damage without resorting to a costly and time-consuming lamination step, receivers with a fusible porous particle topcoat and processes to produce them have been developed. In order to obtain uniform coatings, the coated fluid should have sufficient viscosity or mechanical integrity so that impingement of air during the drying process does not disturb the uniformity of the coated layer. This has generally been accomplished by using hydrophilic polymers that either boost viscosity such as polyvinyl alcohol, or polymers that can be gelled by chilling such as gelatin. There is a problem with this technique, however, in that upon fusing the layer, the hydrophilic binder impairs water resistance.

EP 0 858 905 A1 discloses a process for preparing an ink jet recording element by forming a porous outermost layer by heat treatment of a particulate thermoplastic resin. However, there is a problem with this process in that the coated layer does not set when coated, so that the layer may not always be uniform.

U.S. Pat. No. 5,925,712 discloses a coating composition of a powdered thermoplastic polymer, a water-soluble cationic polymer and a nonionic or cationic latex binder. However, there is a problem with this element in that water-soluble polymers degrade the water resistance of the layer containing them.

It is an object of this invention to provide a process for preparing an ink jet recording element that has an uppermost porous, ink-transporting layer that can be coated from an aqueous solution. It is a further object to provide a process wherein a coated particle dispersion will gel uniformly upon coating prior to the drying stage. Another object is to provide a process for forming a uniform coated layer of particles without the need for a gelling or thickening hydrophilic polymer binder. Still another object is to provide a process for producing a coated porous pass-through layer of thermoplastic particles that will provide a uniformly thick protective layer upon fusing.

SUMMARY OF THE INVENTION

These and other objects are achieved in accordance with the invention comprising a method for making a porous ink jet recording element having a uniform, protective layer comprising coating on a support the following layers in order:

a) a porous, image-receiving layer containing a diffusible coagulant, and b) a layer containing a dispersion of particles which are capable of forming a particle gel with a coagulant;

c) the diffusible coagulant thereby diffusing into the layer containing the dispersion of particles, causing the layer to set to a particle gel; and d) drying the element to obtain a uniform, protective layer on top of the porous, image-receiving layer.

By use of the invention, a porous, ink jet recording element is obtained that has a uniformly thick protective layer upon fusing.

DETAILED DESCRIPTION OF THE INVENTION

Particles which are capable of forming a particle gel with a coagulant which may be used in the invention include those which have ionic functionalities on their surfaces, such as ionomer particles, particles which have adsorbed anionic or cationic surfactants, polyelectrolytes, etc. In a preferred embodiment of the invention, the particles are anionomer particles. In yet another preferred embodiment, the anionomer particles are urethane anionomer particles.

Urethane anionomer particles which may be used in the process of the invention can be water-dispersible, segmented polyurethanes having the following formula:

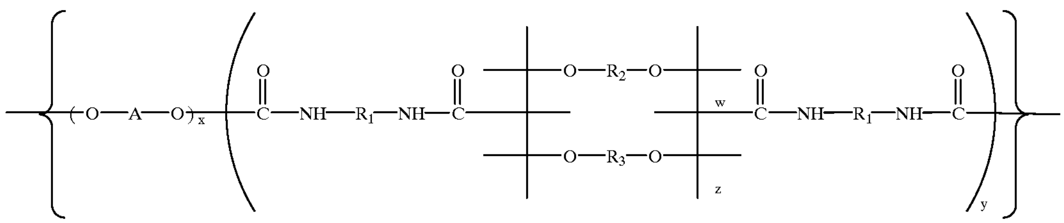

wherein:

$R_1$ is represented by one or more of the following structures:

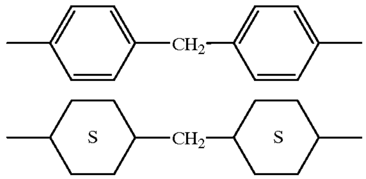

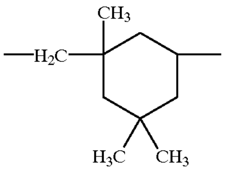

$—CH_2—(CH_2)_4—CH_2—$;

A is derived from a polyol, such as a) a dihydroxy polyester obtained by esterification of a dicarboxylic acid, such as succinic acid, adipic acid, suberic acid, azelaic acid, sebacic acid, phthalic, isophthalic, terephthalic, tetrahydrophthalic acid, and the like, and a diol, such as ethylene glycol, propylene-1,2-glycol, propylene-1,3-glycol, diethylene glycol, butane-1,4-diol, hexane-1,6-diol, octane-1,8-diol, neopentyl glycol, 2-methyl propane-1,3-diol, or the various isomeric bis-hydroxymethylcyclohexanes; b) a dihydroxy polylactone, such as polymers of ε-caprolactone and one of the above mentioned diols; c) a dihydroxy polycarbonate obtained, for example, by reacting one of the above-mentioned diols with diaryl carbonates or phosgene; or d) a dihydroxy polyether, such as a polymer or copolymer of styrene oxide, propylene oxide, tetrahydrofuran, butylene oxide or epichlorohydrin;

$R_2$ represents a substituted or unsubstituted alkyl group of from about 1 to about 12 carbon atoms or a substituted or unsubstituted aryl group of from about 6 to about 24 carbon atoms;

$R_3$ represents an alkyl group of from about 1 to about 12 carbon atoms substituted with phosphonate, carboxylate or sulfonate groups, such as dimethylol propionic acid;

w is an integer of from about 10 to about 60 weight %;

x is an integer of from about 20 to about 40 weight %;

y is an integer of from about 50 to about 80 weight %; and z is an integer of from about 0 to about 10 weight %.

In a preferred embodiment of the invention, the polyurethane has a number average molecular weight of from about 5,000 to about 100,000, more preferably from 10,000 to 50,000. The water-dispersible polyurethane employed in the invention may be prepared as described in "Polyurethane Handbook", Hanser Publishers, Munich Vienna, 1985.

As used herein, a porous, image-receiving layer is one which is usually composed of inorganic or organic particles bonded together by a binder. The amount of particles in this type of coating is often far above the critical particle volume concentration, which results in high porosity in the coating. During the ink jet printing process, ink droplets are rapidly absorbed into the coating through capillary action and the image is dry-to-touch right after it comes out of the printer. Therefore, porous coatings allow a fast "drying" of the ink and produce a smear-resistant image.

In a preferred embodiment of the invention, the porous image-receiving layer comprises from about 20% to about 100% of particles and from about 0% to about 80% of a polymeric binder, preferably from about 80% to about 95% of particles and from about 20% to about 5% of a polymeric binder, such as poly(vinyl alcohol), poly(vinyl pyrrolidinone), poly(vinyl acetate) or copolymers thereof or gelatin. The porous, image-receiving layer can also contain polymer micro-porous structures without inorganic filler particles as shown in U.S. Pat. Nos. 5,374,475 and 4,954,395.

Examples of organic particles which may be used in the image-receiving layer employed in the process of the invention include core/shell particles such as those disclosed in U.S. Ser. No. 09/609/969 of Kapusniak et al., filed Jun. 30, 2000, and homogeneous particles such as those disclosed in U.S. Ser. No. 09/608/466 of Kapusniak et al., filed Jun. 30, 2000, the disclosures of which are hereby incorporated by reference. Examples of organic particles which may be used include acrylic resins, styrenic resins, cellulose derivatives, polyvinyl resins, ethylene-allyl copolymers and polycondensation polymers such as polyesters.

Examples of inorganic particles which may be used in the image-receiving layer employed in the invention include silica, alumina, titanium dioxide, clay, calcium carbonate, barium sulfate, or zinc oxide.

In general, the image-receiving layer may be present in a dry thickness of about 5 to about 60 μm, preferably about 8 to about 45 μm.

As described above, the porous, image-receiving layer contains a diffusible coagulant. A diffusible coagulant may be defined as an electrolyte that will cause the agglomeration in the dispersion of the particles, such as anionomer particles. For clarification of the nomenclature, see "The Use of Nomenclature in Dispersion Science and Technology" NIST Recommended Practice Guide, Special Publication 960-3 U.S. Department of Commerce, February 2001).

When the concentration of the agglomerates is sufficient, a spanning network of particles, i.e., a particle gel is formed. For example, the urethane anionomer particles used in the process of the invention form an electrostatically stabilized suspension in water by virtue of negatively charged functionality on the particle surface such as a carboxylate. A coagulant neutralizes or suppresses the negative surface charge on the particles leading to agglomeration.

In a preferred embodiment of the invention, the electrolyte is a mineral or organic acid or a salt of a monovalent or multivalent cation. Examples of such mineral acids include hydrochloric acid or sulfuric acid. Examples of organic acids that may be used include toluene sulfonic acid or methanesulfonic acid. Salts of monovalent and multivalent cations include sodium chloride, calcium chloride and aluminum chloride. Additional suitable coagulants and methods to generate them in-situ are described in "Novel Powder-Processing Methods for Advanced Ceramics" J. Am Ceram.Soc.,83 [7], 1557-74 (2000).

After coating a support with the porous, image-receiving layer containing a diffusible coagulant and the layer containing the dispersion of particles which are capable of forming a particle gel with a coagulant, the coagulant diffuses into the image-receiving layer and the layer sets to form a particle gel. The element is then dried for about 5 minutes at a temperature of from about 20° C. to about 90° C. using conventional drying equipment such a forced air drying.

A uniform top layer is formed since the coagulant diffuses uniformly up to the top layer from the under layer evenly setting the top layer, which upon drying, forms a layer of uniform thickness.

The layers described above may be coated by conventional coating means onto a support material commonly used in this art. Suitable coating methods include, but are not limited to, wound wire rod coating, slot coating, slide hopper coating, gravure, curtain coating and the like. Some of these methods allow for simultaneous coatings of both layers, which is preferred from a manufacturing economic perspective.

If desired in order to improve the adhesion of the image-receiving layer to the support, the surface of the support may be corona discharge-treated prior to applying the image-receiving layer to the support.

The image-receiving and overcoat layers employed in the invention may contain addenda for enhancing its physical and optical properties such as anti-oxidants, surfactants, light stabilizers, anti-static agents, chemical cross-linking agents, cationic mordants and the like.

Any support or substrate may be used in the recording element employed in the invention. There may be used, for example, calendered or uncalendered pulp-based paper, cast coated or clay coated papers, and woven fabrics such as cotton, nylon, polyester, rayon, and the like. In a preferred embodiment of the invention, the support is resin-coated paper. The support usually has a thickness of from about 12 to about 500 $\mu$m, preferably from about 75 to 300 $\mu$m. Antioxidants, antistatic agents, plasticizers and other known additives may be incorporated into the support, if desired.

Optionally, an additional backing layer or coating may be applied to the backside of a support (i.e., the side of the support opposite the side on which the image-recording layer is coated) for the purposes of improving the machine-handling properties of the recording element, controlling the friction and resistivity thereof, and the like. Typically, the backing layer may comprise a binder and a filler. Typical fillers include amorphous and crystalline silicas, poly (methyl methacrylate), hollow sphere polystyrene beads, micro-crystalline cellulose, zinc oxide, talc, and the like. The filler loaded in the backing layer is generally less than 2 percent by weight of the binder component and the average particle size of the filler material is in the range of 5 to 15 $\mu$m, preferably 5 to 10 $\mu$m. Typical binders used m the backing layer are polymers such as acrylates, methacrylates, polystyrenes, acrylamides, poly(vinyl chloride)-poly(vinyl acetate) co-polymers, poly(vinyl alcohol), cellulose derivatives, and the like. Additionally, an antistatic agent also can be included in the backing layer to prevent static hindrance of the recording element. Particularly suitable antistatic agents are compounds such as dodecylbenzene-sulfonate sodium salt, octylsulfonate potassium salt, oligostyrenesulfonate sodium salt, laurylsulfosuccinate sodium salt, and the like. The antistatic agent may be added to the binder composition in an amount of 0.1 to 15 percent by weight, based on the weight of the binder.

In the present invention, when the ink is ejected from the nozzle of the ink jet printer in the form of individual droplets, the droplets pass through the porous layer containing particles and into the image-receiving layer where most of the dyes in the ink are retained.

Ink jet inks used to image the recording elements of the present invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

The image-receiving layer used in the recording elements of the present invention can also contain various known additives, such as surfactants such as non-ionic, hydrocarbon or fluorocarbon surfactants or cationic surfactants, such as quaternary ammonium salts for the purpose of improving the aging behavior of the ink-absorbent resin or layer, promoting the absorption and drying of a subsequently applied ink thereto, enhancing the surface uniformity of the ink-receiving layer and adjusting the surface tension of the dried coating; fluorescent dyes; pH controllers; anti-foaming agents; lubricants; preservatives; viscosity modifiers; dye-fixing agents; waterproofing agents, dispersing agents, UV-absorbing agents; mildew-proofing agents; mordants; antistatic agents, anti-oxidants, optical brighteners, and the like. Such additives can be selected from known compounds or materials in accordance with the objects to be achieved.

The following examples are provided to illustrate the invention.

EXAMPLES

Example 1

Preparation of Polyurethane Anionomer Particles-P1

In a 2 liter resin flask equipped with thermometer, stirrer, water condenser and a vacuum outlet, 107.5 g (0.125 mole) polycarbonate polyol PC1733, Mw=860, (Stahl Co.) was melted and dewatered under vacuum at 100° C. The vacuum was released and then at 40° C., 10.2 g (0.076 mole) dimethylol propionic acid, 100.52 g (0.299 mole) bisphenol AF, and 75 g methyl ethyl ketone were added. Then 20 drops dibutyltin dilaurate (catalyst) was added while stirring. The temperature was adjusted to 75° C. and maintained until a homogeneous reaction mixture was obtained. Slowly, 111.2 g (0.50 mole) isophorone diisocyanate was added followed by 10 g methyl ethyl ketone. The temperature was raised to 85° C. and maintained until the isocyanate functionality was reduced to substantially nil. While stirring, a stoichiometric amount of potassium hydroxide based on dimethylol propionic acid was added, and maintained for 5 minutes. An amount of water about 5 times the amount of methyl ethyl ketone was added with rapid stirring to form a milky white aqueous dispersion. The mean particle size was 6.1 μm as determined using a Horiba LA-920 Particle Size Analyzer.

Preparation of Polyurethane Anionomer Particles-P2

In a 2 liter resin flask equipped with thermometer, stirrer, water condenser and a vacuum outlet, 111.8 g (0.130 mole) polycarbonate polyol PC1733, was melted and dewatered under vacuum at 100° C. The vacuum was released and then at 40° C., 5.1 g (0.038 mole) dimethylol propionic acid, 112.96 g (0.336 mole) bisphenol AF and 75 g methyl ethyl ketone was added followed by 20 drops dibutyltin dilaurate (catalyst) while stirring. The temperature was adjusted to 80° C. and maintained until a homogeneous reaction mixture was obtained. Slowly, 111.2 g (0.50 mole) isophorone diisocyanate was added followed by 20 g methyl ethyl ketone. The temperature was adjusted to 85° C. and maintained until the isocyanate functionality was reduced to substantially nil. A stoichiometric amount of potassium hydroxide based on dimethylol propionic acid was added and maintained for 5 minutes. An amount of water about 5 times the amount of methyl ethyl ketone under was added under high shear to form a stable aqueous dispersion. The mean particle size was 26 microns.

Preparation of Nonionic Polyurethane Particles-CP (Control)

In a 2 liter resin flask equipped with thermometer, stirrer, water condenser and a vacuum outlet, 107.5 g (0.125 mole) polycarbonate polyol PC1733, was melted and dewatered under vacuum at 100° C. The vacuum was then released and at 40° C., 126.08 g (0.375 mole) bisphenol AF and 100 g ethyl acetate was added followed by 20 drops dibutyltin dilaurate (catalyst) while stirring. The temperature was adjusted to 75° C. and maintained until a homogeneous reaction mixture was obtained. Slowly, 111.2 g (0.50 mole) isophorone diisocyanate was added followed by 10 g ethyl acetate. The temperature was maintained at 75° C. until the isocyanate functionality was reduced to substantially nil.

Then, to 16.3 g of the above polyurethane at 58% solids in ethyl acetate was added an additional 111.4 g of ethyl acetate and 0.5 g of 15% Aerosol OT® in ethyl acetate. This solution was added slowly to 200 ml of distilled water in a Silverson mixer at 5,000 rev/min and emulsified for 2 minutes and then passed once through a Microfluidizer (Microfluidics Manufacturing model 110T) to further reduce the emulsion droplet size. The emulsion was stirred overnight under a nitrogen sweep to evaporate the ethyl acetate. There was obtained an 8.6% solids dispersion of urethane particles. The mean particle size was 3.5 μm. The particles were allowed to settle and sufficient water decanted to produce a 28% solids dispersion.

Gelation Results

The fluidity of 10 g samples of the above particle dispersions adjusted to 25% solids and 45% solids was determined before and after acidification with 1N HCl. The results are shown in Table 1 below where LV denotes a low viscosity particle dispersion that settles over minutes, HV a high viscosity dispersion that settles over hours, and Gel a particle dispersion that does not settle. The following results were obtained:

TABLE 1

| | pH = 8.0 | | pH = 5.0 | |
|---|---|---|---|---|
| Particles | 25% | 45% | 25% | 45% |
| P1 | LV | LV | Gel | Gel |
| P2 | LV | LV | HV | Gel |
| CP (Control) | LV | LV | LV | LV |

The above results show that urethane anionomer particles employed in the process of the invention will gel or build significant viscosity when acidified and that [H+] is a suitable coagulant.

Example 2

Element 1—Porous Particle Layer Having Diffusible Coagulant

An element having a porous particle layer with a diffusible coagulant was prepared by coating on a resin-coated paper support a first 38 μm underlayer of 87% famed alumina, 9% poly(vinyl alcohol), and 4% dihydroxydioxane crosslinking agent. On this layer was coated a second 2 μm layer of 87% fumed alumina, an 8% 100 nm colloidal latex dispersion of divinylbenzene-co-N-vinylbenzyl-N,N,N-trimethylammonium chloride, 6% poly(vinyl alcohol), and 1% Zonyl ®FSN surfactant (DuPont Corp.). The level of diffusible coagulant was determined to be 2.7 meq [H+]/$m^2$ determined by rinsing the layer with water and titrating the extract potentiometrically. A surface pH=3.3 was measured with a flat bottom pH electrode after placing several drops of water on the surface of the layer.

Control Element 1—Porous Particle Layer Without diffusible Coagulant

A sample of Element 1 was washed with 100 cc of 1% sodium bicarbonate solution and allowed to dry. A surface pH=8.0 was found.

Coating Solution, S1, With Particles, P1

A 14% solids dispersion of particles P1 in water was prepared by dilution with deionized water.

Control Coating Solution, S2, With Control Particles, CP

A 14% solids dispersion of control particles CP in water was prepared by dilution.

Coating and Fusing

The above particle dispersions were hopper-coated on Element 1 and Control Element 1 at a laydown of 65 ml/$m^2$ at a coating speed of 1 cm/s and allowed to air dry. The coated layers were then fused with a belt fuser at 150° C. and cross-sectioned at the center and edges of the coating with the results reported in Table 2 below. The "set time" was recorded as the time the coated layer was no longer fluid, with shorter set times preferred. The "drying" profile records the directional nature of the observed drying with uniform drying preferred. The % Δ records the percent difference in thickness between the height of the fused layer in the center vs. the edge of the coating, with no difference preferred. The following results were obtained:

TABLE 2

| Particles | Results | Layers | |
|---|---|---|---|
| | | L1 | Control Layer |
| P1 | Set time | <l min | >l0 min |
| | Drying | Uniform | Edge in |
| | % Δ | 0 | 50 |
| CP | Set time | >l0 min | >l0 min |
| | Drying | Edge in | Edge in |
| | % Δ | * | * |

*particle layer was so fragile it could not be evaluated

The above results show that urethane anionomer particles, P1, when coated on a layer with a diffusible coagulant, L1, rapidly set and dried evenly to give a uniform protective layer on fusing, whereas the control coatings dried slowly and non-uniformly leading to an uneven protection layer upon fusing.

Although the invention has been described in detail with reference to certain preferred embodiments for the purpose of illustration, it is to be understood that variations and modifications can be made by those skilled in the art without departing from the spirit and scope of the invention.

What is claimed is:

1. A method for making a porous ink jet recording element having a uniform, protective layer comprising coating on a support the following layers in order:

a) a porous, image-receiving layer containing a diffusible coagulant; and b) a layer containing a dispersion of particles which are capable of forming a particle gel with a coagulant;

c) said diffusible coagulant thereby diffusing into said layer containing said dispersion of particles, causing said layer to set to a particle gel; and d) drying said element to obtain a uniform, protective layer on top of said porous, image-receiving layer.

2. The process of claim 1 wherein said particles comprise anionomer particles.

3. The process of claim 1 wherein said uniform, protective layer is fusible.

4. The process of claim 2 wherein said dispersion of anionomer particles is a dispersion of urethane anionomer particles.

5. The process of claim 4 wherein said urethane anionomer particles have the formula:

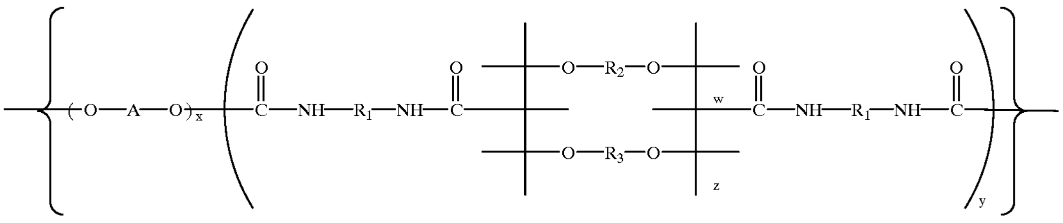

wherein:

$R_1$ is represented by one or more of the following structures:

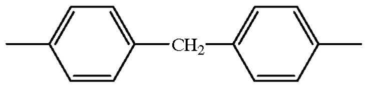

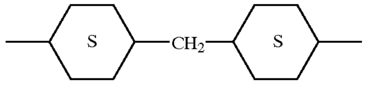

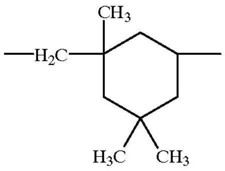

$—CH_2—(CH_2)_4—CH_2—$;

A is derived from a polyol;

$R_2$ represents a substituted or unsubstituted alkyl group of from about 1 to about 12 carbon atoms or a substituted or unsubstituted aryl group of from about 6 to about 24 carbon atoms;

$R_3$ represents an alkyl group of from about 1 to about 12 carbon atoms substituted with phosphonate, carboxylate or sulfonate groups;

w is an integer of from about 10 to about 60 weight %;

x is an integer of from about 20 to about 40 weight %;

y is an integer of from about 50 to about 80 weight %; and z is an integer of from about 0 to about 10 weight %.

6. The process of claim 4 wherein said urethane anionomer particles have a negatively-charged functionality on their surfaces.

7. The process of claim 5 wherein said negatively-charged functionality is carboxylate, sulfonate or phosphonate.

8. The process of claim 1 wherein said diffusible coagulant is an electrolyte that will cause the agglomeration of said dispersion of particles.

9. The process of claim 8 wherein said electrolyte is a mineral or organic acid or a salt of a monovalent or multivalent cation.

10. The process of claim 9 wherein said mineral acid is hydrochloric acid or sulfuric acid.

11. The process of claim 9 wherein said organic acid is toluene sulfonic acid or methanesulfonic acid.

12. The process of claim 9 wherein salt of a monovalent or multivalent cation is sodium chloride, calcium chloride or aluminum chloride.

13. The process of claim 1 wherein said porous, image-receiving layer contains organic or inorganic particles.

14. The method of claim 13 wherein said porous, image-receiving layer comprises from about 20% to about 100% of said particles and from about 0% to about 80% of a polymeric binder.

15. The method of claim 13 wherein said particles comprise silica, alumina, titanium dioxide, clay, calcium carbonate, barium sulfate or zinc oxide.

16. The method of claim 14 wherein said polymeric binder is poly(vinyl alcohol), poly(vinyl pyrrolidinone), poly(vinyl acetate) or copolymers thereof, or gelatin.

17. The method of claim 1 wherein said porous, image-receiving layer comprises a polymeric open-pore membrane.

18. The method of claim 2 wherein said layer containing a dispersion of anionomer particles also contains a latex binder.

19. The process of claim 1 wherein said support is resin-coated paper.

* * * * *